W. B. EDDISON.
METHOD AND APPARATUS FOR MIXING AND PROPORTIONING GASES.
APPLICATION FILED JUNE 14, 1917.

1,294,781.

Patented Feb. 18, 1919.
2 SHEETS—SHEET 2.

WITNESSES:

INVENTOR.
W Bertram Eddison
BY
his ATTORNEY

UNITED STATES PATENT OFFICE.

WILLIAM BARTON EDDISON, OF IRVINGTON, NEW YORK, ASSIGNOR TO THE SURFACE COMBUSTION CO., INCORPORATED, OF NEW YORK, N. Y., A CORPORATION OF NEW YORK.

METHOD AND APPARATUS FOR MIXING AND PROPORTIONING GASES.

1,294,781.  Specification of Letters Patent.  Patented Feb. 18, 1919.

Application filed June 14, 1917.  Serial No. 174,818.

*To all whom it may concern:*

Be it known that I, WILLIAM BARTON EDDISON, a citizen of the United States, residing at Irvington, in the county of Westchester and State of New York, have invented certain new and useful Improvements in Methods and Apparatus for Mixing and Proportioning Gases, fully described and represented in the following specification and the accompanying drawings, forming a part of the same.

This invention relates to a method and apparatus for mixing and proportioning gases, and more especially to a method and apparatus for supplying an explosive mixture of air and fuel gas in constant proportions to surface combustion furnaces at a velocity suitable to the requirements of surface combustion.

The object of the invention is, generally, to provide a method and apparatus whereby a well mixed homogeneous explosive gaseous mixture may be conveniently supplied to the burner discharge orifice of a surface combustion furnace at a pressure above a predetermined minimum and in quantities variable at will and without changing the proportions of the constituent gases, that is, to meet the conditions of constant proportions, variable quantity and exit pressure sufficient to prevent backflashing. More particularly, the invention aims to provide a method and apparatus whereby the desired gaseous mixture is supplied as above stated through the utilization of the pressure energy of fuel gas supplied at a comparatively high pressure to inspirate atmospheric air, mix it with the gas and expel the mixture through the burner orifice.

Fuel gas is frequently distributed under pressures ranging from 15 pounds up to 25 or 30 pounds per square inch, and where such so-called high-pressure gas is available it has been found in many instances desirable to utilize the pressure of such gas as above stated and avoid the necessity of supplying the air for the explosive mixture under pressure, and it has been found that with properly constructed apparatus it is possible, even though there must be several times the quantity of air in the mixture that there is of gas, to supply the desired mixture to the burner orifice under sufficient pressure to cause the same to be discharged from the orifice with the required velocity in excess of the rate of backward propagation of inflammation of the mixture through a range of supply pressure of the fuel gas running down to 3 pounds or less, thus providing a considerable range of mixture supply pressure even with an available gas pressure of only say from 10 to 15 pounds.

The invention comprises a method wherein the pressure energy of the fuel gas supplied under suitable pressure is changed largely to velocity energy with corresponding reduction of pressure and the formation of a high velocity low-pressure jet by which air is entrained and mixed with the fuel gas, some of the velocity energy of the mixture thus produced being then changed back to pressure energy, and the mixture being discharged under the desired pressure from the burner orifice; the flow of the induced gas and of the mixture being controlled according to the flow law of orifices having constant coefficients, and the furnace pressure or pressure against which the mixture is discharged being approximately equal to atmospheric pressure or the pressure under which the air is supplied. The invention also comprises apparatus for producing and supplying a gaseous mixture in accordance with such method, all as hereinafter more fully described and as claimed.

In carrying out the invention, the fuel gas which is to serve as the inducing gas is supplied, from a source of supply under a suitable pressure, and under control of an adjustable restriction or controlling valve to a discharge orifice from which a jet of the gas is discharged through an intervening space into the throat of a Venturi tube, that is, a tube or conduit of substantially circular cross-section and comprising an entrance cone, or portion tapering from large to small in the direction of flow, and a discharge cone beyond the entrance cone which tapers from small to large and which is joined to the entrance cone by a throat or portion of minimum cross-section, the two tapering portions being of limited angle between their sides. In passing through the gas discharge orifice, the pressure energy of the fuel gas is largely changed into velocity energy with corresponding reduction of pressure so that the jet passing across the space between the discharge orifice and the Venturi throat and into the Venturi throat shall have a high velocity with its gas under a correspondingly low pressure. By the action of such jet, which takes the form of an expanding cone, there is induced a flow of air from the space surrounding the jet into the entrance cone and throat of the Venturi tube, resistance to the entrance of such air into the Venturi tube being reduced and its flow into the throat of the tube facilitated by the entrance cone of the tube, so that the gas and air more or less mixed together enter and flow through the throat of the Venturi tube with a relatively high velocity and under relatively low pressure which is approximately equal to atmosphere or the pressure in the air chamber. As the mixture of gas and air then passes on through the diverging portion, or pressure cone, of the Venturi tube, velocity energy is converted back into pressure energy so that the mixture passing on from the Venturi tube through a suitable relatively large conduit will be supplied to the burner nozzle or discharge orifice under a suitable pressure which will be greater than the atmospheric pressure and sufficiently greater than the internal furnace pressure, which is assumed to be approximately equal to atmospheric pressure, to cause the mixture to be discharged from the burner orifice with the required excess velocity. In passing through the Venturi tube, the gas and air become thoroughly commingled so that a homogeneous mixture of the gas and air is supplied to be discharged from the burner orifice. A homogeneous mixture of fuel gas and air will thus be supplied to the burner nozzle or orifice and will be discharged under a suitable pressure therefrom into the furnace at a suitable velocity to prevent backflashing through the burner orifice so that, the mixture being an explosive gaseous mixture, surface combustion thereof may take place as desired.

With the parts of the apparatus suitably formed and proportioned, and with the gas nozzle or discharge orifice of suitable size in proportion to the Venturi throat according to the character of the fuel gas and suitably positioned with relation to the throat, an explosive mixture of the fuel gas and air in the desired proportions may be obtained and such proportions maintained approximately constant under variations in the amount of mixture supplied resulting from variations in the amount of gas supplied, or the pressure under which the gas reaches the discharge orifice, so that in practice the amount of mixture of uniform proportions supplied may be varied within the working range of the apparatus simply by adjusting the control valve or adjustable restriction by which the supply of gas is controlled.

In order to maintain the proportions of fuel gas in the mixture constant under variations in gas flow and the resulting amount of mixture supplied, the flow of the air and of the mixture is controlled by orifices having approximately constant coefficients of discharge, and there should be no or substantially no dead flow resistance between the controlling orifices. The Venturi tube has its entrance and discharge cones of such limited angles that the gas will hug the sides of the discharge cone and not jump away therefrom and set up eddy currents therein; and the pressure under which the air, that is, the induced gas, is supplied should be substantially equal to the internal furnace pressure, or pressure against which the mixture is discharged from the burner orifice. This condition is met by the drawing of the air for the mixture directly from the surrounding atmosphere when the furnace pressure is approximately atmospheric pressure, and one of the advantages of the method and apparatus of the present invention is that the air for the mixture may be drawn directly from the atmosphere, thus avoiding the necessity of providing such auxiliary apparatus as motors, blowers and pressure governors. Also the necessity of a two-pipe supply system is avoided. The area of the discharge nozzle or burner orifice or orifices should bear a suitable relation to the area of the Venturi throat; that is, the area of the discharge orifice or orifices should be small enough so that the proper or necessary pressure may be built up in the mixture flowing through the discharge or pressure cone of the Venturi tube, while yet being large enough so that there may be a sufficiently low pressure and corresponding low resistance to flow in the Venturi throat for the desired proportionate flow of air to take place.

The proportionate amounts of gas and air in the mixture formed and delivered will depend primarily upon the form and proportions of parts of the apparatus, and particularly on the relative sizes of the gas discharge orifice and the Venturi throat and their relative positions. The proportions may also be varied within limits by suitably controlling the flow of air to the entrance cone of the Venturi tube, and this method of adjusting proportions is desirable as it provides a way for securing the necessary adjustment within a range which is usually sufficient in practice without disturbance of the Venturi tube or gas discharge nozzle and which permits of the adjustment being readily made while the apparatus is in operation.

The invention includes various other apparatus features which will be hereinafter fully described and pointed out in the claims.

By the term "surface combustion" as used herein is meant the combustion of an explosive gaseous mixture which is supplied at a velocity in excess of the rate of propagation of inflammation through the mixture so as to prevent backflashing through the supply nozzle or orifice, the mixture being then caused to spread out with rapid increase of its stream cross-section and consequent reduction of its flow velocity, and combustion taking place in a zone or surface at which the flow velocity of the mixture is equal to its rate of propagation of inflammation. Such surface combustion is disclosed in U. S. patents of Dr. Charles E. Lucke, among which are No. 755,376, dated March 22, 1904, and No. 1,146,724, dated July 13, 1915.

A full understanding of the invention can best be given by a detailed description of an approved form of apparatus embodying the apparatus features of the invention and adapted for carrying out the method, and of the operation thereof, and such a description will now be given in connection with the accompanying drawings showing such an apparatus, and in which:—

Figure 1:
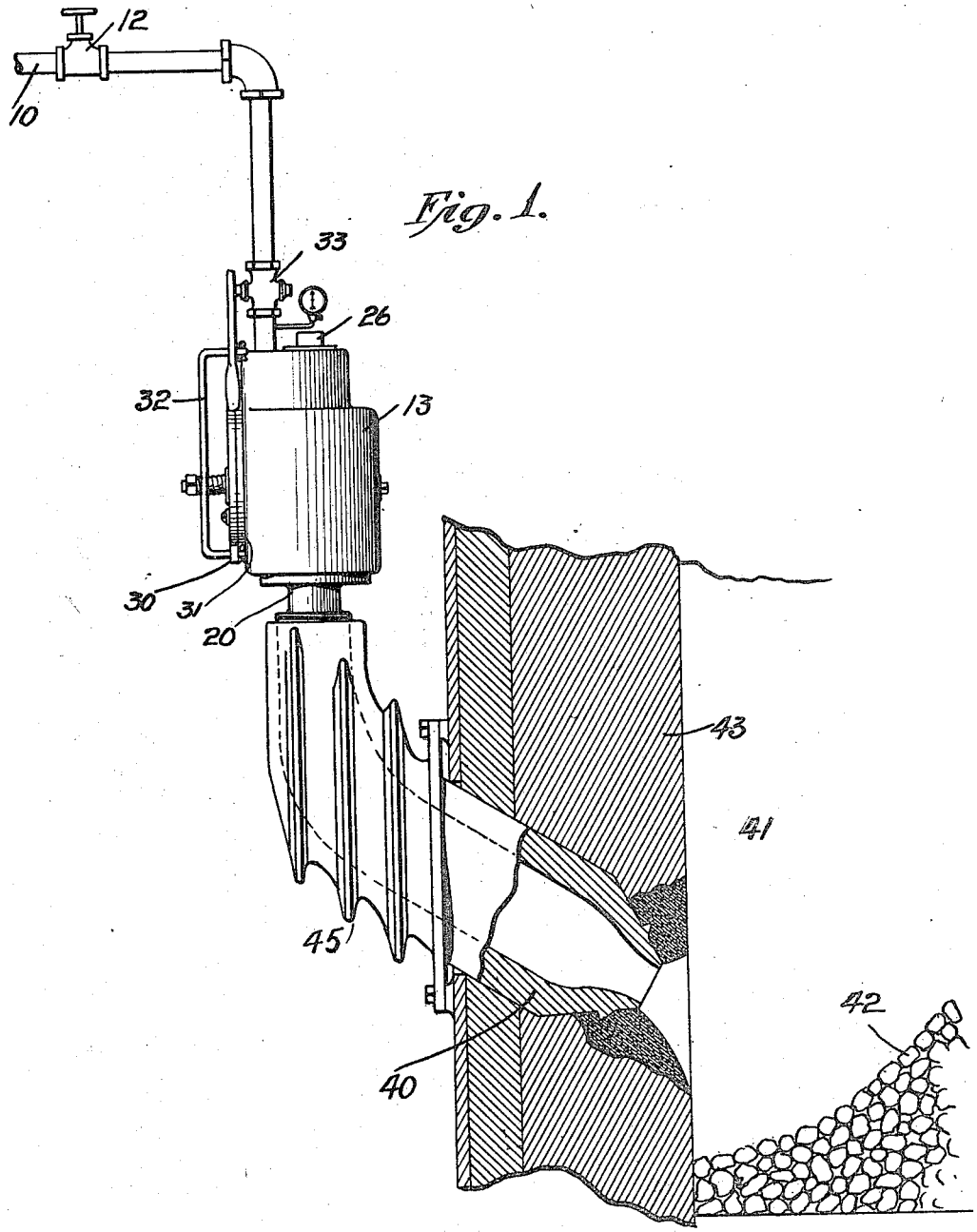
Figure 1 is a view showing the apparatus in elevation and a part of a furnace to which the apparatus is attached in section.
Figure 2:
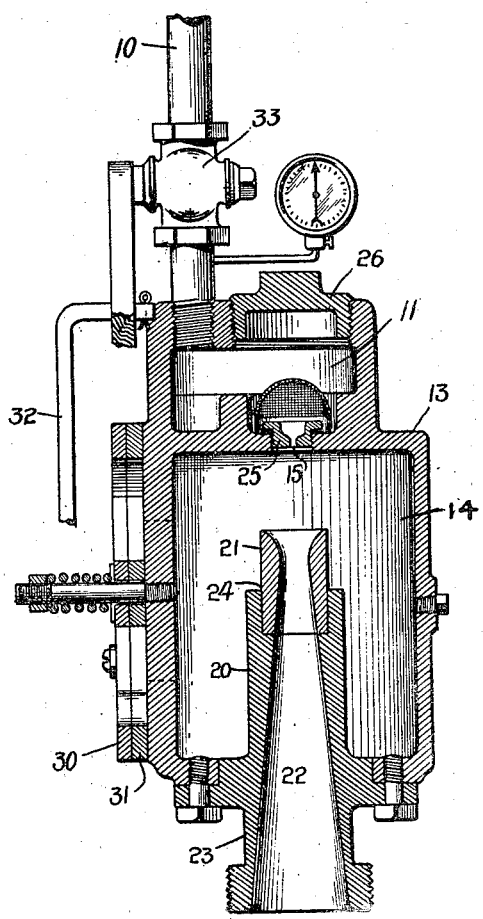
Fig. 2 is a sectional view of the mixing and proportioning device on a larger scale.
Figure 3:
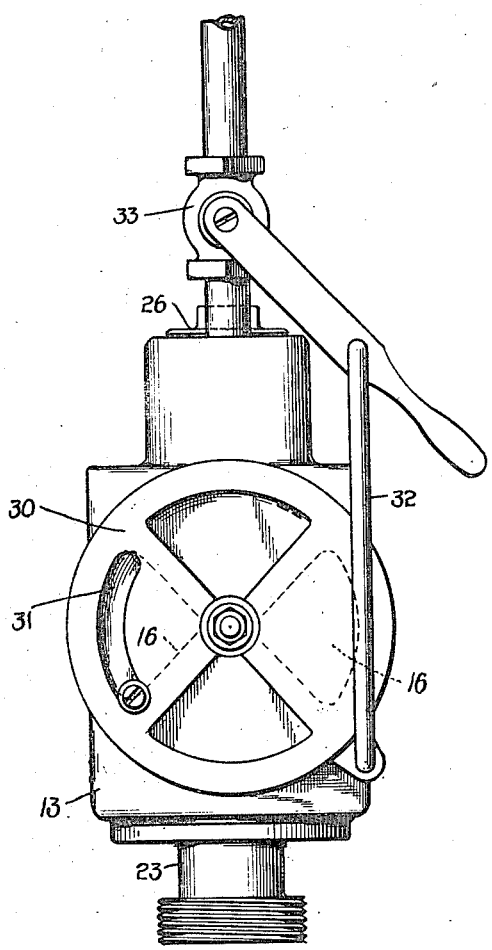
Fig. 3 is a view in elevation looking from the left of Fig. 2.

Referring to the drawings, the fuel gas which is to serve as the driving or inducing gas is supplied under a suitable pressure from a source of supply such as a high pressure distribution main, being supplied through a supply pipe 10 to a chamber 11, an adjustable restriction or valve 12 being provided in the supply pipe for controlling the supply of gas to the chamber 11 and the pressure maintained therein. The gas chamber 11 is formed in the upper part of the inspirator body or casing 13 which also provides an air chamber 14 separated from the gas chamber by a partition and connected therewith by a gas discharge orifice 15. Air enters the chamber 14 through inlet openings 16, and the apparatus is provided with means for closing these openings and for adjusting the effective size thereof for the purpose hereinafter explained.

Mounted opposite the gas orifice 15 in position to receive the jet of gas issuing therefrom, is a Venturi tube 20, the entrance cone 21 of which opens into the chamber 14, and the end of the discharge cone 22 of which is connected to supply the mixture to the mixture discharge orifice of the burner nozzle. The air chamber is most desirably of a length considerably greater than the distance from the gas nozzle to the entrance end of the Venturi tube, and the tube is located with its entrance end extending into the chamber so as to provide a space about the tube to insure an even flow of air into the entrance cone of the tube without other means for baffling the air to insure such even flow. The main portion of the Venturi tube is desirably formed as shown by a casting or other piece 23 of metal or other suitable material having a shouldered flange at a suitable distance from its inner end formed to be set in an opening in the end wall of the body casing 13 and removably secured in position as by tap bolts as shown. For convenience in manufacture, the entrance cone, throat and the first portion of the walls of the discharge cone of the tube are formed by a separate throat piece 24 fitted into the end of the main piece or body 23 of the tube.

The fuel gas issues from the gas orifice 15 in the form of a high velocity jet, the jet, flowing from an orifice of the proper form as hereinafter described, takes the form of a slightly expanding or cone-shaped jet of gas carrying with it an increasing amount of entrained air as the distance from the orifice 15 increases. The jet or stream of gas and entrained air entering the entrance cone and throat of the Venturi tube causes a flow of additional air into the tube with it. The pressure in the throat of the tube is low, usually about equal to the pressure in the air chamber 14, but as the mixture thus produced flows on from the Venturi throat through the discharge cone of the tube, its velocity is largely changed into pressure energy, so that the mixture is supplied to the burner tube and is discharged from the burner orifice at a suitable pressure greater than atmospheric pressure, or the pressure under which the air was supplied to the tube.

The Venturi tube should be of suitable form and of suitable limited angles between the sides of its entrance and discharge cones in order that approximately constant proportions of the gas and air in the mixture may be maintained under variations in quantity of mixture delivered, and also in order that the energy of the driving gas may be efficiently employed to supply the mixture under the desired pressure.

If the angle between the sides of the discharge cone 22 of the tube is too great, the stream of mixed gas and air, which passes through the throat at relatively high velocity, will not hug or flow smoothly along the sides of the discharge cone, and disturbing formation of side or eddy currents will result. The presence of such side or eddy currents interferes with the regular reduction of the velocity of the flowing mixture in the discharge cone and prevents the maximum rise in pressure consistent with or corresponding to the decrease in velocity. The presence of such eddy currents also results in a variation in the position longitudinally of the tube of the point of minimum jet cross-section under variations in the rate of flow. This would interfere with the maintenance of constant proportions of the constituent gases in the mixture, since it would mean a corresponding change in location of the point of maximum velocity and minimum pressure, the location of which is determined by the minimum jet cross-section of the stream, and not necessarily by the minimum cross-section or throat of the tube. Such movement of the point of maximum velocity and minimum pressure under variable rates of flow must be avoided, and location of this point must be maintained constant for all rates of flow within the normal range of the apparatus, in order that constant proportions may be maintained. On the other hand, too small an angle would mean an excessive length of the cone and involve excessive friction losses. An angle of 10° between the sides of the discharge cone has been found to work well under usual conditions of operation.

If the included angle between the walls of the entrance cone 21 is too large, the throat and first part of the discharge cone will not be properly filled with the gas and air mixture, and eddy currents will result, preventing full recovery of pressure corresponding to the loss in velocity and interfering with the proportionality element by causing under variations in quantity of mixture flowing a movement longitudinal of the tube of the point of maximum velocity and minimum pressure. To avoid this condition, the angle between the sides of the entrance cone and the formation of the cone should for best results be such that its coefficient of discharge will be approximately constant within the working range of flow rates, and desirably this coefficient should be practically 100 per cent. This angle may be varied considerably without bad results, but should not be so small as to cause the entering air to encounter excessive friction in reaching the throat. A comparatively short entrance cone is sufficient and desirable, and a length equal to about one-half the diameter of the throat has been found to work well.

The Venturi tube should therefore have its entrance and discharge cones of such limited angles that the air and gas will hug the sides of the discharge cone and maintain the position of the point of minimum jet cross-section stationary at the throat of the tube, and that the desired rise in pressure will be developed and the necessary change of velocity energy back into pressure energy effected without excessive friction losses.

The gas orifice 15 should be of such form as to give the gas jet as much velocity energy as possible, and should therefore have a suitably rounded entrance followed by a straight or approximately straight run of a length, say, about equal to its diameter, or sufficient to properly direct and form the jet. From such a nozzle, the jet discharged into air under approximately atmospheric pressure and with the gas reaching the orifice under pressures up to approximately 15 pounds above atmosphere will be a slightly and uniformly expanding jet first of gas alone and then of gas with air increasing in amount as the distance from the orifice increases. The discharge side of the gas nozzle is found to be of relatively small importance and may therefore be made to suit conditions of practice, that is, of such shape as to be easily made and of rugged construction to withstand handling.

For convenience in manufacture, and in order to permit ready change of the gas orifice as desired, the orifice is formed in a removable nozzle piece 25 which is secured in position most desirably by being threaded to screw into a tapped hole in the partition between the gas chamber and the air chamber, and the wall of the gas chamber opposite the partition wall is formed with an opening normally closed by a screw plug 26 through which access may be readily had for setting or removing the gas nozzle.

The end of the Venturi tube is spaced off from the gas nozzle to give the air in the chamber 14 access directly to the gas jet so that the jet may exert an entraining action on the air, the larger part of the air entering the Venturi tube with the gas to form the mixture in the apparatus shown in the drawings being air which joins and mixes with the gas before the latter enters the throat of the Venturi tube. The distance between the discharge side of the gas nozzle and the throat, or place of minimum cross-section, of the Venturi tube varies according to the size or area of the gas orifice. With a tube of the form shown the distance should be such that a large proportionate amount of the total air required to form the mixture shall be entrained with the gas flowing free between the discharge orifice and the Venturi throat, the jet of gas and entrained air when it reaches such point containing such proportionate amounts of gas and air as to produce with such additional air as enters the throat a mixture of the desired proportions. The point is to allow a sufficient distance for free flow of the gas from the orifice to the Venturi throat to secure the desired entraining action without having it so great as to cause too large a proportionate amount of air to be entrained or too much loss of energy in the jet. The exact distance is readily determined by experiment and has to be varied to suit conditions, and especially according to the relative size of the Venturi throat. The Venturi throat should be of sufficient cross-area to pass under the conditions of operation the required volume of air and gas entering the mixture, being of such size as to be substantially filled by the stream of gas and entrained air entering it.

With increase in the pressure under which the gas is supplied to the discharge orifice 15 substantially above 15 pounds above atmospheric pressure, the jet issuing from a gas orifice properly formed as above described for operating with gas pressures not substantially above 15 pounds, tends when issuing into an atmosphere of normal pressure to expand suddenly at the nozzle due to the atmosphere being below the critical pressure of the issuing jet, and this is accompanied with a decrease in the relative amount of air carried into the Venturi tube, causing a slight increase in richness of the mixture formed, which becomes greater as the increase in gas supply pressure above 15 pounds becomes greater. The resulting departure from constancy of proportions in the mixture with such increase in gas supply pressure above 15 pounds has not been found serious in working with gas pressures within the usual working range of from 3 or 4 up to 20 or 25 pounds.

The relative size of the gas discharge orifice will vary according to the character of the fuel gas to be used, the richer the gas the smaller the orifice, and vice versa. Change in mixture proportions for any given fuel gas may also be accomplished by changing the area of the gas orifice, this being accomplished in the construction shown by changing the nozzle. Ordinary variation or adjustment of proportions is most conveniently effected, however, by controlling the supply of air to the air chamber 14, and for this purpose in the construction shown the shutter 30 which is adapted to open and close the air inlet openings or ports 16 has adjustably connected to it a plate 31 by which the size of the shutter openings which register with the inlet ports when the shutter is in its open position may be varied. The ports 16 are of such size relatively to the Venturi throat that when they are full open approximately full atmospheric pressure will be maintained in the air chamber. When, however the plate 31 is adjusted to partly close the shutter openings, the flow of air into the air chamber is restricted and the pressure in the air chamber lowered, and a smaller proportionate amount of air enters the Venturi throat with the gas. A limited adjustment of proportions may be effected by such means without substantially affecting the maintenance of proportions under variations in the amount of mixture supplied within the usual working range of the apparatus.

In order to prevent back-draft from the furnace chamber through the inspirator when the gas is shut off, the shutter 30 is provided for closing the air inlet ports 16, and in order to insure the closing of the shutter when the gas is shut off, the shutter, which in the construction shown is an oscillating shutter pivoted to the side of the inspirator body, is connected by a link 32 to the handle of a shut-off valve 33 in the gas supply pipe.

Because of the low available mixture pressure, it has been found best with the form of mixing apparatus shown to have the mixing apparatus supply a single burner nozzle to which the discharge cone of the Venturi tube of the mixing apparatus is most desirably directly connected so as to avoid practically all dead flow resistance between the Venturi tube and the burner orifice. Such an arrangement is desirable also for reducing mixture space and thereby avoiding trouble from back-firing when shutting down, which results from the inability to purge the pipe connections with air.

As shown, the discharge cone 22 is connected directly to the outer end of a burner nozzle or mixture discharge tube 40 of an impact jet, surface combustion furnace for burning explosive gaseous mixtures according to the method of U. S. Patent No. 1,146,724, granted on an application of Dr. Charles E. Lucke. The furnace, a broken section of which is shown in Fig. 1, comprises a structure providing a furnace chamber 41 provided with a porous and permeable combustion supporting bed 42 of refractory material against which the jet of the explosive gaseous mixture is directed from the nozzle 40 set in the furnace wall 43. The jet of mixture, moving with a velocity in excess of the rate of propagation of inflammation of the mixture, strikes against the combustion bed, the mixture being thereby deflected and caused to spread out with rapid loss of flow velocity and burning at the surface of or within the bed as described in said patent.

The burner nozzle has a discharge orifice of constant coefficient form, and the connecting passage between such orifice and the Venturi tube, that is, the passage through the nozzle body or tube in the construction shown, is of such relatively large size that there will be no or substantially no pipe resistance to affect the flow of the mixture. The flow of air and gas into the Venturi tube and the flow of the mixture will thus be controlled only according to the flow law of orifices, and whatever velocity and pressure change takes place will be according to the flow law of orifices, and not by reason of pipe, bend or eddy current losses.

In the operation of the furnace, the development of back pressure resulting from the heating of the mixture in the burner nozzle through the nozzle becoming highly heated, would, in the absence of some means for compensating for the increase in back pressure, cause a change in the proportions of gas and air in the mixture, since the increase in back pressure by increasing the pressure in the expansion cone of the Venturi tube would result in a reduction of the flow velocity through the Venturi throat and a reduction in the proportionate amount of air entering the Venturi tube. Such heating of the mixture in the burner nozzle is also bad in that it reduces the amount of mixture flowing from the nozzle under the available pressure. Such undesirable results are best avoided by using burner nozzles having an approximately constant pressure-capacity characteristic, this characteristic of the nozzles being secured by forming the nozzles so that the walls of the discharge passage shall be prevented from becoming excessively heated in operation. This is accomplished in the burner nozzle shown in the drawings by having the nozzle formed and set in the furnace wall so that only a small portion of the end or nose of the nozzle is exposed to the furnace heat, the balance thereof being protected by the surrounding wall of material which is a poor heat conductor, and by forming the nozzle of a body of metal of sufficient continuous mass to rapidly conduct away to the outer portions of the nozzle body or tube such heat as is absorbed by the exposed nose of the nozzle, and by forming or providing the outer end of the nozzle tube with means for discharging the heat, such as the heat dissipating fins or plates 45.

The area of the discharge orifice of the burner nozzle, or the aggregate area of the orifices when a plurality of nozzles are supplied from a single mixing apparatus, should, as hereinbefore pointed out, bear a suitable relation to the capacity of the mixing apparatus and especially to the cross-area of the Venturi throat. Too great an area of the burner discharge orifice would prevent the building up of the necessary mixture pressure for causing the required excess velocity of discharge from the nozzle, and too small an area of the discharge orifice would prevent sufficient pressure reduction at the Venturi throat and cause too great a resistance to flow in the Venturi throat for the desired proportionate flow of air to take place. I have had good results under the conditions herein referred to with the area of the burner orifice or orifices from three to four times the cross-area of the Venturi throat. It should be noted also that any change in the burner discharge orifice area will affect the proportionality of the mixture.

In the operation of the apparatus, the gas being available under a suitable pressure, and the apparatus being adjusted to secure the desired proportions for any flow rate, then the amount of mixture supplied may be varied as desired within the working limits of the apparatus simply by adjusting the gas control valve 12, the proportions of gas and air in the mixture being maintained substantially constant. With the opening and closing of the gas control valve, permitting more or less gas to flow, the air flow increases and decreases proportionately, and the final delivery pressure to the burner orifice rises and falls correspondingly, and all the desired conditions are fulfilled. In shutting down, the gas is shut off by closing the shut-off valve 33, the air shutter 30 being simultaneously turned to close the air inlet ports 16 and thereby preventing back draft from the furnace chamber through the inspirator.

The term "orifice" as used in the claims is to be understood to mean an opening which is restricted as compared to the adjacent flow passage or space and so formed as to control the flow of gas therethrough according to the typical flow law of orifices $$(V = C\sqrt{2gh}),$$

true when the pressure or head $h$ is not too large, and an orifice having a constant coefficient, or a constant coefficient orifice, is to be understood as an orifice the coefficient of discharge of which is approximately constant within the normal working range of the apparatus, or for which the area of the contracted vein of the jet is itself constant. It is desirable that the coefficient of the orifices controlling the flow of air and of the mixture should be approximately 100%. It may be pointed out that the air inlet ports as varied in size by adjustment of the shutter plate 31 act as constant coefficient orifices under the low head under which the air passes therethrough.

What is claimed is:

1. The method of supplying an explosive mixture of fuel gas and air in approximately constant proportions to a furnace, which comprises directing a high velocity jet of fuel gas across an intervening air space and into the entrance cone and throat of a Venturi tube formed to maintain the point of minimum jet cross-section stationary under varying flow rates, the air pressure in said space being substantially equal to the pressure against which the mixture is discharged into the furnace and the air having free and direct access to the jet of fuel gas in said space and a large proportionate amount of the air in the mixture being entrained with the fuel gas as the latter moves across said space and before it enters the Venturi entrance cone and throat, controlling the flow of the mixture from the pressure cone of the Venturi tube into the furnace according to the flow law of orifices having constant coefficients, and varying the quantity of mixture supplied without substantially changing the proportions of the fuel gas and air therein by varying the amount of fuel gas supplied.

2. The method of supplying an explosive mixture of fuel gas and air in approximately constant proportions to a furnace, which comprises directing a high velocity jet of the fuel gas across an intervening air space and into a mixing throat, the air pressure in said space being substantially equal to the furnace pressure against which the mixture is discharged, the air having free and direct access to the jet of fuel gas in said space, and a large proportionate amount of the air in the mixture being entrained with the fuel gas before the latter enters said throat, changing some of the velocity energy of the mixture thus produced back to pressure energy, and discharging the mixture into the furnace chamber through a discharge orifice to which the mixture is supplied by a connection formed to avoid pipe, bend and eddy losses.

3. The method of supplying an explosive mixture of fuel gas and air in approximately constant proportions to a furnace, which comprises directing a high velocity jet of the fuel gas across an intervening air space in which the air has free and direct access thereto and into a mixing throat, supplying air to said space through a constant coefficient orifice under a supply pressure substantially equal to the pressure against which the mixture is discharged, the distance the driving jet flows before entering the mixing throat being such that the amount of entrained air moving with the fuel gas in the jet entering the mixing throat shall approximate the amount desired in the mixture, changing some of the velocity energy thus produced back to pressure energy, and discharging the mixture into the furnace chamber through a discharge orifice to which the mixture is supplied by a connection formed to avoid pipe, bend and eddy losses.

4. The method of supplying an explosive mixture of fuel gas and air in approximately constant proportions to a furnace, which comprises directing a high velocity jet of the fuel gas across an intervening air space and into the throat of a Venturi tube formed to maintain the point of minimum jet cross-section stationary under varying flow rates, supplying air to such space through a constant coefficient inlet orifice under a supply pressure substantially equal to the pressure against which the mixture is discharged, the air having free and direct access to the jet of fuel gas in said space and a large proportionate amount of the air in the mixture being entrained with the fuel gas before the latter enters said throat, controlling the flow of the mixture from the pressure cone of the Venturi tube into the furnace according to the flow law of orifices having constant coefficients, varying the proportions of fuel gas and air in the mixture by varying the size of the air inlet orifice, and varying the quantity of mixture supplied without substantially changing the proportions of fuel gas and air therein by varying the amount of fuel gas supplied.

5. Apparatus for producing and supplying a mixture of gases in approximately constant proportions, comprising in combination a Venturi tube formed to maintain the point of minimum jet cross-section stationary under varying flow rates, means for directing across an intervening space and into the entrance cone of the Venturi tube in the direction of flow through the tube a high velocity jet of the gas which is to serve as the driving gas, means comprising an inlet orifice for supplying another gas to said space to be carried by said high velocity jet into the entrance cone of the Venturi tube, the gas in said space having free and direct access to the high velocity jet of gas, means providing a flow controlling orifice for controlling the flow of the gaseous mixture received from the Venturi tube, means for varying the supply of the driving gas for varying the quantity of the mixture produced, and means for varying the size of said inlet orifice for varying the proportions of the gases in the mixture.

6. Apparatus for producing and supplying an explosive mixture of fuel gas and air in approximately constant proportions, comprising a Venturi tube formed to maintain the point of minimum jet cross section stationary under varying flow rates, means for directing a high velocity jet of the fuel gas across an intervening space into the entrance cone of the Venturi tube in the direction of flow through the tube, the air pressure in said space being substantially equal to the pressure against which the mixture is discharged, the air having free and direct access to the jet of fuel gas in said space, and the distance between said jet directing means and the entrance cone and throat of the Venturi tube being such that the amount of entrained air moving with the fuel gas in the jet entering the Venturi tube shall be a large proportionate amount of the total air required in the mixture, a flow controlling orifice, and a connecting passage between said orifice and the Venturi tube formed to avoid pipe, bend and eddy losses.

7. Apparatus for producing and supplying an explosive mixture of fuel gas and air in approximately constant proportions, comprising a Venturi tube formed to maintain the point of minimum jet cross-section stationary under varying flow rates, means for supplying the fuel gas under pressure to serve as the driving gas, a nozzle set to discharge a high velocity jet of the fuel gas across an intervening space into the entrance cone of the Venturi tube in the direction of flow through the tube, an inlet orifice for supplying air to said space from a source of supply under pressure substantially equal to the pressure against which the mixture is discharged, the distance between the gas nozzle and the entrance cone and throat of the Venturi tube being such that the amount of entrained air moving with the fuel gas in the jet entering the Venturi tube shall approximate the amount desired in the mixture, a flow controlling orifice, and a connecting passage between said orifice and the Venturi tube formed to avoid pipe, bend and eddy losses.

8. Apparatus for producing and burning an explosive mixture of fuel gas and air in approximately constant proportions, comprising means providing an air chamber of relatively large size, a Venturi tube formed to maintain the point of minimum jet cross-section stationary under varying flow rates and having its entrance cone open to the air chamber, means for supplying the fuel gas under pressure to serve as the driving gas, a nozzle set to discharge a high velocity jet of the fuel gas across an intervening space in the air chamber into the entrance cone of the Venturi tube in the direction of flow through the tube, the air having free and direct access to the jet of fuel gas and the distance between the gas nozzle and the entrance cone of the Venturi tube being such that the amount of entrained air moving with the fuel gas in the jet entering the Venturi tube shall be a large proportionate amount of the total air required in the mixture, an inlet orifice for admitting air under atmospheric pressure to the air chamber, adjusting means for varying the size of said inlet orifice to vary the proportions of fuel gas and air in the mixture, a burner nozzle through which the mixture is discharged to be burned, said nozzle being formed to control the flow of the mixture according to the flow law of orifices having constant coefficients, and a connecting passage between the burner orifice and the Venturi tube formed and proportioned to avoid pipe, bend and eddy losses.

9. Apparatus for producing and supplying an explosive mixture of fuel gas and air to a furnace burner, comprising a Venturi tube, means for directing a driving jet of the fuel gas into the Venturi tube in the direction of flow through the tube, a casing extending about the entrance cone of the Venturi tube and having an air inlet opening, means for varying the supply of the fuel gas to vary the quantity of mixture produced, a shut-off valve for shutting off the supply of the fuel gas, a shutter for closing the air inlet opening, and connecting means whereby the air shutter is closed when the gas shut-off valve is closed, thereby preventing back draft from the furnace chamber.

10. Apparatus for producing and supplying an explosive mixture of fuel gas and air to a furnace burner, comprising a Venturi tube, means for directing a driving jet of the fuel gas into the Venturi tube in the direction of flow through the tube, a casing extending about the entrance cone of the Venturi tube and having an air inlet opening, means for varying the supply of the fuel gas to vary the quantity of mixture produced, a shut-off valve for shutting off the supply of the fuel gas, a shutter for closing the air inlet opening, connecting means whereby the air shutter is closed when the gas shut-off valve is closed, thereby preventing back draft from the furnace chamber, and means for varying the effective size of the air inlet opening to vary the proportions of fuel gas and air in the mixture.

11. A mixing device for fuel gas and air, comprising a casing formed to provide a gas chamber and an air chamber separated by a partition, a gas inlet to the gas chamber, an air inlet to the air chamber, a Venturi tube set with its entrance cone opening into the air chamber, a removable nozzle piece formed to provide a gas discharge orifice, said nozzle piece being set in said partition to discharge a jet of gas into the entrance cone of the Venturi tube, and a normally closed opening in the wall of the gas chamber opposite said nozzle piece through which the nozzle piece may be removed.

In testimony whereof I have hereunto set my hand in the presence of two subscribing witnesses.

W. BARTON EDDISON.

Witnesses:
WILLIAM J. HARRIS, Jr.,
H. F. WHITE.